United States Patent
King et al.

(10) Patent No.: US 7,306,654 B2
(45) Date of Patent: Dec. 11, 2007

(54) METHOD AND APPARATUS FOR RECOVERING WATER FROM ATMOSPHERIC AIR

(76) Inventors: Ronald King, 72 Straddock Crescent SW., Calgary, Alberta (CA) T3H 2T2; Norman L. Arrison, 11412-102 Avenue, Edmonton, Alberta (CA) T5K 0P9

( * ) Notice: Subject to any disclaimer, the term of this patent is extended or adjusted under 35 U.S.C. 154(b) by 247 days.

(21) Appl. No.: 10/768,390

(22) Filed: Jan. 30, 2004

(65) Prior Publication Data

US 2006/0130654 A1    Jun. 22, 2006

(51) Int. Cl.
*B01D 53/14* (2006.01)
*B01D 5/00* (2006.01)

(52) U.S. Cl. .............. 95/224; 95/231; 62/640; 62/643; 203/12

(58) Field of Classification Search ........... 95/187, 95/224, 227, 228, 231, 8, 14, 19; 96/242, 96/281; 62/615, 640, 643; 203/12
See application file for complete search history.

(56) References Cited

U.S. PATENT DOCUMENTS

| | | |
|---|---|---|
| 452,208 A | 5/1891 | Baker |
| 2,138,687 A | 11/1938 | Altenkirch |
| 2,350,348 A | 6/1944 | Gaugler |
| 3,229,759 A | 1/1966 | Grover et al. |
| 3,305,005 A | 2/1967 | Grover et al. |
| 3,343,346 A | 9/1967 | Broyard |
| 3,385,575 A | 5/1968 | Hall |
| 3,400,515 A | 9/1968 | Ackerman |
| 3,777,456 A | 12/1973 | Lund |
| 4,035,172 A | 7/1977 | Strindehag et al. |
| 4,055,403 A | 10/1977 | Strauss .................. 55/31 |
| 4,146,372 A | 3/1979 | Groth et al. |
| 4,178,158 A | 12/1979 | Yoshida et al. |
| 4,219,341 A | 8/1980 | Hussmann |

(Continued)

FOREIGN PATENT DOCUMENTS

CA       1085591       9/1980

(Continued)

OTHER PUBLICATIONS

IPER of corresponding PCT/CA2005/000076 dated Aug. 10, 2006.

*Primary Examiner*—Frank M. Lawrence
(74) *Attorney, Agent, or Firm*—Ohlandt, Greeley, Ruggiero & Perle, L.L.P.

(57) ABSTRACT

A method of separating water from air is provided comprising the steps of (a) contacting air having water vapor with an hygroscopic liquid mixture to produce a water rich hygroscopic liquid mixture, (b) heating at least a portion of the water rich hygroscopic liquid mixture to produce a gaseous mixture including water vapor and at least one other gaseous component, (c) condensing at least a portion of the water vapor in the gaseous mixture to produce liquid water and a depleted gaseous mixture at a first pressure, and (d) removing at least a portion of the at least one other gaseous component to maintain the first pressure below a predetermined pressure, wherein the depleted gaseous mixture is in fluid communication with the water rich hygroscopic liquid mixture. An absorber vessel is also provided for effecting the method of separating water from air.

9 Claims, 3 Drawing Sheets

U.S. PATENT DOCUMENTS

| | | | |
|---|---|---|---|
| 4,285,702 A | 8/1981 | Michel et al. | |
| 4,290,208 A | 9/1981 | Hellman | |
| 4,299,599 A | 11/1981 | Takeyama et al. | |
| 4,304,577 A | 12/1981 | Ito et al. | |
| 4,312,640 A | 1/1982 | Verrando | |
| 4,342,569 A | 8/1982 | Hussmann | |
| 4,365,979 A * | 12/1982 | Takeyama et al. | 96/123 |
| 4,380,909 A | 4/1983 | Sung | |
| 4,434,034 A | 2/1984 | Padilla | |
| 4,726,817 A | 2/1988 | Roger | |
| 4,756,726 A | 7/1988 | Peace | |
| 4,979,965 A | 12/1990 | Sanholm | |
| 5,048,200 A | 9/1991 | Ryham | |
| 5,084,074 A | 1/1992 | Beer et al. | 55/20 |
| 5,222,375 A | 6/1993 | Conrad et al. | |
| 5,233,843 A | 8/1993 | Clarke | |
| 5,259,203 A | 11/1993 | Engel et al. | |
| 5,426,953 A | 6/1995 | Meckler | |
| 5,441,605 A | 8/1995 | Beasley et al. | |
| 5,471,852 A | 12/1995 | Meckler | |
| 5,490,873 A | 2/1996 | Behrens et al. | |
| 5,553,459 A | 9/1996 | Harrison | |
| 5,566,468 A | 10/1996 | Graeff | |
| 5,575,832 A | 11/1996 | Boyd | |
| 5,632,802 A | 5/1997 | Grgich et al. | |
| 5,676,173 A | 10/1997 | Conrad et al. | |
| 5,701,749 A | 12/1997 | Zakryk | |
| 5,766,423 A | 6/1998 | Smith | |
| 5,817,167 A | 10/1998 | DesChamps | |
| 5,846,296 A | 12/1998 | Krumsvik | |
| 5,934,328 A | 8/1999 | Conrad et al. | |
| 6,001,315 A | 12/1999 | Conrad et al. | |
| 6,029,467 A | 2/2000 | Moratalla | |
| 6,134,903 A * | 10/2000 | Potnis et al. | 62/271 |
| 6,156,100 A | 12/2000 | Conrad et al. | |
| 6,156,102 A | 12/2000 | Conrad et al. | |
| 6,162,283 A | 12/2000 | Conrad et al. | |
| 6,178,762 B1 | 1/2001 | Flax | |
| 6,217,635 B1 | 4/2001 | Conrad et al. | |
| 6,235,207 B1 | 5/2001 | Conrad | |
| 6,250,324 B1 | 6/2001 | Conrad et al. | |
| 6,251,172 B1 | 6/2001 | Conrad | |
| 6,289,689 B1 | 9/2001 | Zakryk | |
| 6,309,514 B1 | 10/2001 | Conrad et al. | |
| 6,312,606 B1 | 11/2001 | Conrad | |
| 6,336,957 B1 | 1/2002 | Tsymerman | |
| 6,361,686 B1 | 3/2002 | Conrad | |
| 6,393,725 B1 | 5/2002 | Smith et al. | |
| 6,423,954 B1 | 7/2002 | Zettergren | |
| 6,436,172 B1 | 8/2002 | Rabiger | |
| 6,444,964 B1 | 9/2002 | Eastlund et al. | |
| 6,455,000 B1 | 9/2002 | Conrad et al. | |
| 6,461,413 B1 | 10/2002 | Landreau et al. | |
| 6,488,819 B2 | 12/2002 | Conrad et al. | |
| 6,491,811 B2 | 12/2002 | Conrad et al. | |
| 6,960,243 B1 * | 11/2005 | Smith et al. | 95/117 |
| 2001/0047929 A1 | 12/2001 | Conrad et al. | |
| 2002/0027109 A1 | 3/2002 | Conrad et al. | |
| 2002/0113151 A1 | 8/2002 | Forber Jones et al. | |

FOREIGN PATENT DOCUMENTS

| | | |
|---|---|---|
| CA | 2253693 | 2/2000 |
| CA | 2288545 | 2/2000 |
| CA | 2253079 | 5/2000 |
| CA | 2253101 | 5/2000 |
| CA | 2253689 | 5/2000 |
| CA | 2253697 | 5/2000 |
| CA | 2288543 | 5/2000 |
| CA | 2288544 | 5/2000 |
| CA | 2288546 | 5/2000 |
| CA | 2289054 | 5/2000 |
| CA | 2289060 | 5/2000 |
| EP | 0 597 716 | 11/1993 |
| GB | 2252738 | 8/1992 |
| WO | WO 99/66136 | 12/1999 |
| WO | WO 03/025295 | 3/2003 |

* cited by examiner

METHOD AND APPARATUS FOR RECOVERING WATER FROM ATMOSPHERIC AIR

FIELD OF INVENTION

The present invention relates to a method and apparatus for recovering water from atmospheric air and, more particularly, relates to absorption of water vapour from atmospheric air by a liquid absorbent and subsequent regeneration of the liquid absorbent and recovery of the absorbed water vapour.

BACKGROUND OF THE INVENTION

It is a well understood fact that a large portion of the world's population, especially in underdeveloped countries, does not have access to clean, potable water. In the developed world, many of the sources of water for human consumption are unable to keep pace with demand. Further, quality is either unsustainable or increasingly expensive. Thus, the need for alternative affordable solutions is substantial. In many geographic regions, the need is critical for sustaining human health and life.

Existing methods for extracting and recovering water from atmospheric air are known. However, known methods suffer from the fact that they are energy intensive and operationally complex. This embodiment describes a very efficient method of operation.

SUMMARY OF THE INVENTION

In one aspect, the present invention provides a method of separating water from air comprising the steps of (a) contacting air having water vapour with an hygroscopic liquid mixture to produce a water rich hygroscopic liquid mixture, (b) heating at least a portion of the water rich hygroscopic liquid mixture to produce a gaseous mixture including water vapour and at least one other gaseous component, (c) condensing at least a portion of the water vapour in the gaseous mixture to produce liquid water and a depleted gaseous mixture at a first pressure, and (d) removing at least a portion of the at least one other gaseous component to maintain the first pressure below a predetermined pressure, wherein the depleted gaseous mixture is in fluid communication with the water rich hygroscopic liquid mixture being heated.

In another aspect, the present invention provides a method of separating water from air comprising the steps of (a) contacting air having water vapour with an hygroscopic liquid mixture to produce a water rich hygroscopic liquid mixture, ( ) heating at least a portion of the water rich hygroscopic liquid mixture to produce a gaseous mixture having water vapour, (c) condensing at least a portion of the water vapour in the gaseous mixture to produce liquid water and heat energy, and (d) transferring an effective amount of the heat energy to a working fluid including a liquid to effect vapourization of at least a portion of the liquid to produce a working fluid gaseous mixture.

In yet another aspect, the present invention provides a method of recovering water from air comprising the steps of: (a) contacting air having water vapour with an hygroscopic liquid mixture to produce a water rich hygroscopic liquid mixture, (b) in a first pressure envelope, heating the water rich hygroscopic liquid mixture to produce a gaseous mixture having water vapour, condensing at least a portion of the water vapour in the gaseous mixture to produce liquid water and a depleted gaseous mixture, and separating the liquid water from the depleted gaseous mixture so as to provide collected liquid water and a depleted gaseous mixture at subatmospheric pressure disposed in a vapour space above the collected liquid water, (c) effecting fluid pressure communication between a second pressure envelope and the vapour space, and (d) flowing the collected liquid from the first pressure envelope and into the second pressure envelope.

In a further aspect, the present invention provides an absorption system for effecting removal of water from atmospheric air by an hygroscopic liquid mixture comprising: an absorber vessel defining a space for facilitating contact between air having water vapour and an hygroscopic liquid mixture, including an input air flow inlet, configured for introducing an input air flow having water vapour into the space, a depleted air flow outlet, configured for discharging a depleted air flow, and means for introducing a hygroscopic liquid mixture into the space for effecting contact between the hygroscopic liquid mixture and the input air flow, a base, wherein the absorber vessel is rotatably mounted to the base about an axis for effecting positioning of the input air flow inlet at a desired position relative to the axis.

In another aspect, the present invention provides a method of recovering water from air comprising: (a) providing an absorption system for effecting removal of water from atmospheric air flow by an hygroscopic liquid mixture comprising an absorber vessel defining a space for facilitating contact between air having water vapour and an hygroscopic liquid mixture, including an input air flow inlet, configured for introducing an input air flow having water vapour into the space, a depleted air flow outlet, configured for discharging a depleted air flow, and means for introducing a hygroscopic liquid mixture into the space for effecting contact between the hygroscopic liquid mixture and the input air flow, and a base, wherein the absorber vessel rotatably mounted to the base about an axis for effecting positioning of the input air flow inlet at a desired position relative to the axis, (b) measuring the direction of atmospheric air flow; and (c) rotating the absorber vessel about the axis so as to effect desired positioning of the input air flow inlet relative to the atmospheric air flow direction in response to the measured atmospheric air flow direction.

In one aspect, the present invention provides an absorber vessel defining a space for facilitating contact between air having water vapour and an hygroscopic liquid mixture, including an input air flow inlet, configured for introducing an input air flow having water vapour into the space, a depleted air flow outlet, configured for discharging a depleted air flow, at least one first liquid inlet spray nozzle, configured for introducing a largest diameter fine size droplet into the space at a first position, a second liquid inlet spray nozzle, configured for introducing a largest diameter coarse size droplet into the space at a second position disposed in closer proximity to the outlet relative to the introduced largest diameter fine size nozzle, wherein the largest diameter coarse size droplet has a greater diameter than the largest diameter fine size droplet when the same liquid is flowed through each of the first and second liquid inlet spray nozzles under the same operating conditions, In another aspect, the present invention provides a method of separating water from air comprising the steps of: providing an absorber vessel defining a space for facilitating contact between air having water vapour and an hygroscopic liquid mixture, introducing an air flow into the space, spraying first hygroscopic liquid mixture droplets into the space for effecting contact between the first hygroscopic liquid mixture and the air flow, wherein at least one of the first hygroscopic liquid mixture droplets is a largest diameter fine size droplet, and spraying second hygroscopic liquid mixture droplets into the space downstream of the first hygroscopic liquid mixture droplets for effecting contact between the second hygroscopic liquid mixture and the air flow containing an entrained portion of the first hygroscopic liquid mixture droplets, wherein at least one of the second hygroscopic liquid mixture droplets is a largest diameter coarse size droplet, wherein the largest diameter coarse size droplet has a greater diameter than the largest diameter fine size droplet.

In another aspect, the present invention provides a method of separating water from air comprising the steps of: (a) contacting air having water vapour with a hygroscopic liquid mixture consisting of a supersaturated aqueous solution of lithium chloride to produce a water rich hygroscopic liquid mixture, (b) heating at least a portion of the water rich hygroscopic liquid mixture to produce a gaseous mixture including water vapour and at least one other gaseous component, and (c) condensing at least a portion of the water vapour in the gaseous mixture to produce liquid water.

In another aspect, the present invention provides a method of separating water from air comprising the steps of: (a) contacting air having water vapour with an hygroscopic liquid mixture to produce a water rich hygroscopic liquid mixture, (b) heating at least a portion of the water rich hygroscopic liquid mixture with heat generated by a waste heat source to produce a gaseous mixture including water vapour, and (c) condensing at least a portion of the water vapour to produce liquid water.

DESCRIPTION OF THE DRAWINGS

The invention will be better understood and objects other than those set forth above will become apparent when consideration is given to the following detailed description thereof Such description makes reference to the annexed drawings wherein.

DETAILED DESCRIPTION

Figure 1:
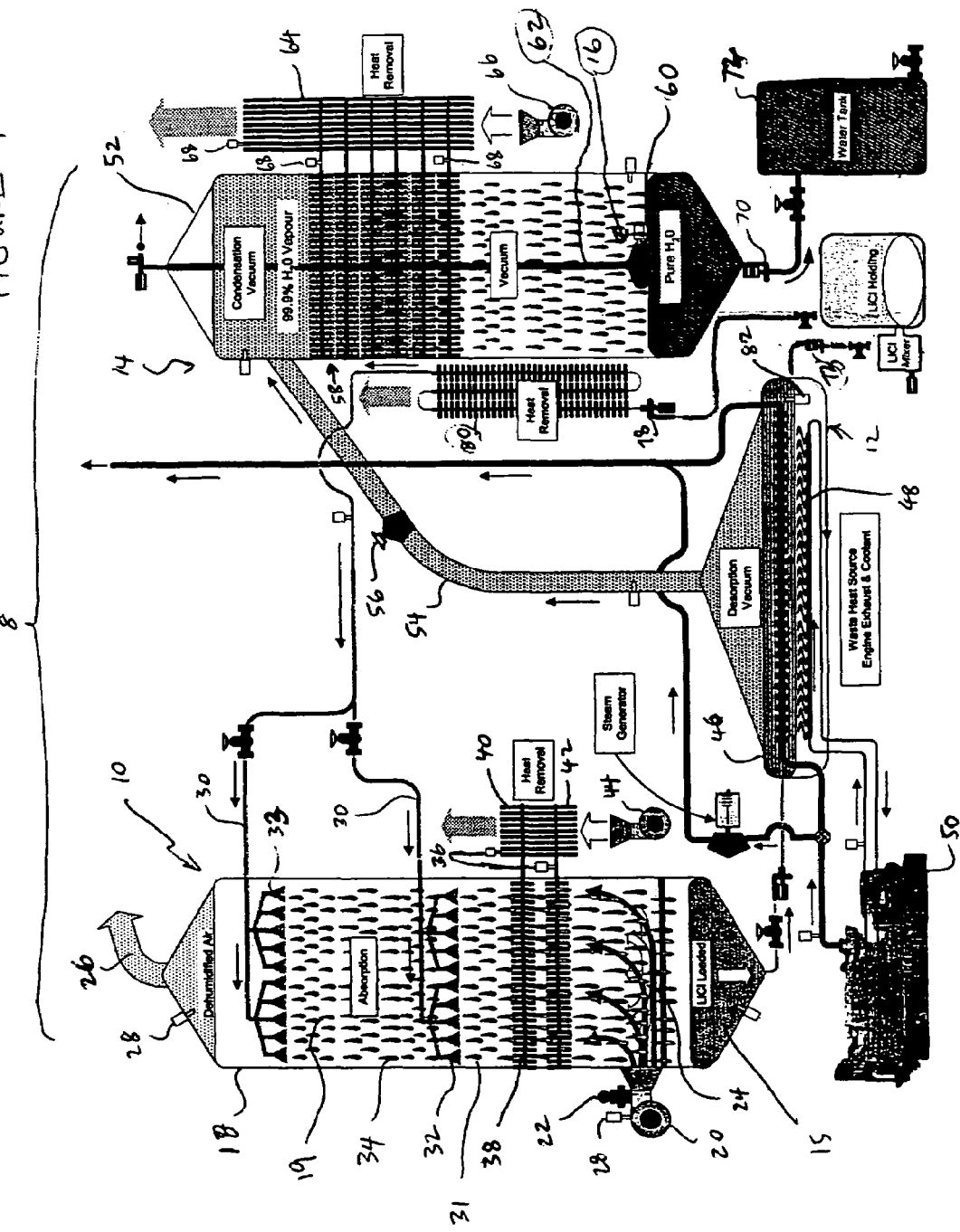
FIG. 1 is a schematic illustration of an embodiment of the system of the present invention.
Figure 2:
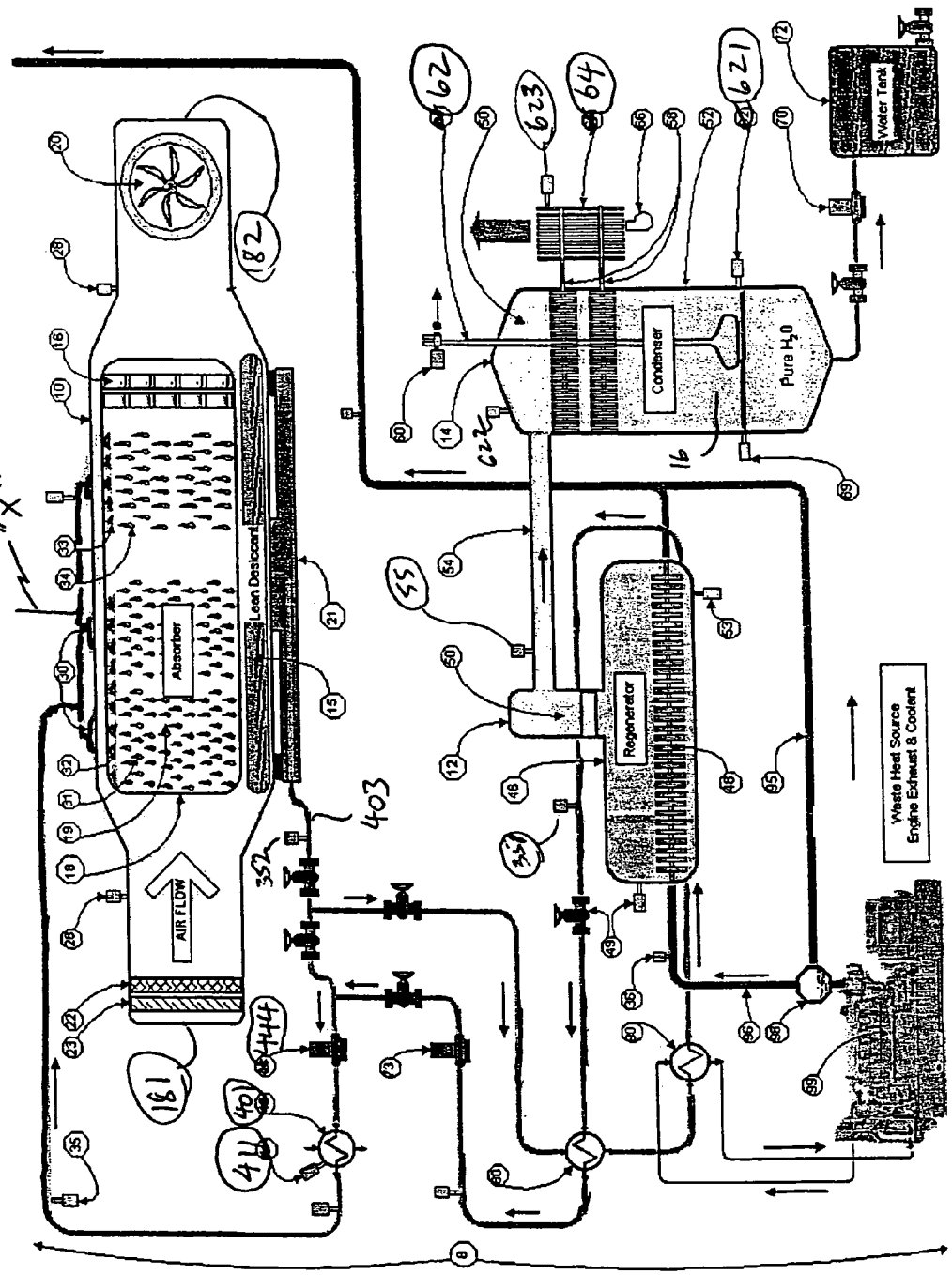
FIG. 2 is a schematic illustration of a second embodiment of the system of the present invention.

FIGS. 1 and 2 illustrate embodiments of the present invention. The present invention includes a system 8 for effecting the separation of water vapour from atmospheric air. In this respect, the system 8 includes an absorber 10 for effecting the separation of water vapour from atmospheric air by absorption of the water vapour by a hygroscopic liquid mixture and subsequent recovery of the water vapour from the water rich hygroscopic liquid mixture as liquid water. In the FIG. 1 embodiment, the absorber 10 is substantially vertical, and the flows of atmospheric air and the hygroscopic liquid mixture are countercurrent relative to one another. In the FIG. 2 embodiment, the absorber is substantially horizontal, and the flows of atmospheric air and the hygroscopic liquid mixture are crossflow relative to one another The absorber 10 is configured for effecting contact between atmospheric air and a hygroscopic liquid mixture to produce a depleted air system and a water rich hygroscopic liquid mixture. Water rich hygroscopic liquid mixture describes a fluid flow which initially was a hygroscopic liquid mixture introduced into the absorber 10 which has subsequently absorbed water upon contact with atmospheric air in the absorber 10.

Preferably, the hygroscopic liquid mixture is an aqueous solution of a hygroscopic solute. More preferably, the hygroscopic liquid mixture is a liquid dessicant such as a solution of a Group 1 and/or a Group 2 salt (preferably a chloride), in water, glycol, glycerine or sulphuric acid. Even more preferably, the hygroscopic liquid mixture is an aqueous lithium chloride (LiCl) solution It is understood that various concentrations of aqueous lithium chloride solution are suitable for the purpose of a hygroscopic liquid mixture. In a preferred embodiment, the hygroscopic liquid mixture comprises from 30 wt % to 50 wt % LiCl salt based upon the total weight of the aqueous lithium chloride solution. In one embodiment, the solution comprises about 40 wt % LiCl salt and 60 wt % water.

In terms of the extent to which the hygroscopic liquid mixture is able to absorb water from atmospheric air, it has been recognized that the hygroscopic liquid mixture can be a supersaturated aqueous solution of LiCl. In this respect, the hygroscopic liquid mixture can be an aqueous lithium chloride solution comprising an effective amount of LiCl to render the solution to be supersaturated (greater concentration of dissolved LiCl in water than that predicted under equilibrium conditions at a given temperature and pressure). The hygroscopic liquid mixture leaving the desorption vessel 46 can be a supersaturated solution of LiCl in water. The hygroscopic liquid mixture becomes such a supersaturated solution as a result of water being vaporized from the water rich hygroscopic liquid mixture. As water is vapourized in the desorption vessel 46, the concentration of the LiCl in the liquid mixture increases. Eventually, the concentration increases beyond the known equilibrium saturation point. So long as the mixture is relatively clean, the LiCl will not precipitate out as the LiCl concentration moves beyond the equilibrium saturation point. For example, the absorption process can operate with an hygroscopic liquid mixture consisting of an aqueous solution having 40 wt % LiCl based on the total weight of the solution, at a temperature less than 0° C. and at atmospheric pressure, Such an aqueous solution is supersaturated at these temperature and pressure conditions, as such solution has a higher concentration of LiCl than would normally be obtained (ie. predicted by equilibrium data) in a saturated solution of LiCl in water (ie. 40 wt % LiCl dissolved in water at these temperature and pressure conditions is more than would normally be possible). It has been observed that the concentration of LiCl in an aqueous solution functioning as the hygroscopic liquid mixture can exceed its equilibrium (saturation) concentration in aqueous solution (at a given temperature and pressure) by up to 7%. By using a supersaturated solution as the hygroscopic liquid mixture, additional water can be absorbed from the atmospheric air flow at lower temperatures by the same volume of hygroscopic liquid mixture within the absorber.

In this respect, in one aspect, the present invention provides a method of separating water from air comprising the steps of: (a) contacting air having water vapour with a hygroscopic liquid mixture consisting of a supersaturated aqueous solution of lithium chloride to produce a water rich hygroscopic liquid mixture, (b) heating at least a portion of the water rich hygroscopic liquid mixture to produce a gaseous mixture including water vapour and at least one other gaseous component, and (c) condensing at least a portion of the water vapour in the gaseous mixture to produce liquid water.

The absorber 10 is fluidly coupled to a desorber 12 to effect transfer of at least a portion of the water rich hygroscopic liquid mixture from the absorber 10 to the desorber 12. The desorber 12 is configured for heating the water rich hygroscopic liquid mixture to produce a gaseous mixture including water (in the form of water vapour) and small amounts of at least one other gaseous component and a regenerated hygroscopic liquid mixture. Concomitantly, the vaporization of the gaseous mixture leaves a regenerated hygroscopic liquid mixture for reuse in the absorber 10. The desorber 12 is fluidly coupled to a condenser 14 for transferring the gaseous mixture to the condenser 14. The condenser 14 is configured for condensing the water vapour in the gaseous mixture. In condensing the water vapour in the exemplary embodiment, the condenser 14 is also configured to transfer sufficient heat energy from the water vapour to a working fluid including a liquid to effect vaporization of at least a portion of the liquid (for example, the liquid of a working fluid in a heat pipe). Means 60 are provided to effect removal of at least a portion of the other gaseous components from the gaseous mixture to maintain the pressure of the gaseous mixture below a predetermined pressure. In the preferred embodiment, the predetermined pressure is a subatmospheric pressure. Once the water rich hygroscopic liquid mixture is depleted of at least a portion of its contents by vaporization in the desorber 12, the remaining hygroscopic liquid mixture is returned to the absorber 10.

Absorber

As mentioned above, the system 8 includes an absorber 10 having an absorber vessel 18 for effecting contact between (i) atmospheric air having water vapour, and (ii) the hygroscopic liquid mixture. An electrical variable speed atmospheric air fan 20 is provided and configured to continuously introduce the atmospheric air to the absorber vessel 18 in either a pull or push configuration and create a flow of atmospheric air through the absorber vessel 18. Prior to entering the absorber vessel 18, the atmospheric air passes through an air filtration system 22 to remove dust and other unwanted airborne particles. The atmospheric air flows through the absorber vessel 18 and becomes depleted in water vapour as the atmospheric air makes contact with the hygroscopic liquid mixture in the reaction zone 19. The removal of water vapour from the atmospheric air is monitored by temperature, humidity and pressure sensors 28 located at the atmospheric air entrance and exit of the absorber vessel 18.

Referring to FIG. 2, in one embodiment, the absorber 10 could be rotatably mounted to a base 21. In this respect, the absorber 10 is configured for rotation relative to the base 21 so that the atmospheric air entrance is facing the prevailing wind direction thereby reducing the amount of energy required to operate the fan 20. Wind speed and direction information can be obtained from a mast mounted weather station with the sensors to measure air temperature, rainfall, relative humidity, solar radiation, wind speed, wind direction, and barometric pressure. To retrieve the weather measurements, a spread spectrum radio provides a data connection between the weather station sensor assembly and the computer used to run the software that stores and processes the weather information. A variable control air flow damper 23 can be provided in the event the prevailing atmospheric air wind speeds exceed the desired atmospheric air flow rate through the absorber vessel 18. Rotation on the base 21 and air flow damper 23 controls can be effected by the system 8 control software and mechanically driven by electrical motors or other similar means. The benefit is minimal to no energy requirements to move atmospheric air through the absorber vessel 18.

In this respect, in one aspect, the present invention provides an absorption system for effecting removal of water from atmospheric air by an hygroscopic liquid mixture comprising an absorber vessel 18 defining a space 19 for facilitating contact between air having water vapour and an hygroscopic liquid mixture, including an input air flow inlet 181, configured for introducing an input air flow having water vapour into the space, a depleted air flow outlet 182, configured for discharging a depleted air flow, and means for introducing a hygroscopic liquid mixture into the space 19 for effecting contact between the hygroscopic liquid mixture and the input air flow. The absorber vessel 18 is rotatably mounted to the base 21 about an axis "X" for effecting positioning of the input air flow inlet at a desired position relative to the axis.

In parallel, in another aspect, the present invention provides a method of recovering water from air comprising (a) providing an absorption system for effecting removal of water from atmospheric air flow by an hygroscopic liquid mixture comprising an absorber vessel defining a space for facilitating contact between air having water vapour and an hygroscopic liquid mixture, including an input air flow inlet, configured for introducing an input air flow having water vapour into the space, a depleted air flow outlet, configured for discharging a depleted air flow, and means for introducing a hygroscopic liquid mixture into the space for effecting contact between the hygroscopic liquid mixture and the input air flow, and a base, wherein the rotatably mounted to the base about an axis for effecting positioning of the input air flow inlet at a desired position relative to the axis, (b) measuring the direction of atmospheric air flow, and (c) rotating the absorber tank about the axis so as to effect desired positioning of the input air flow inlet relative to the atmospheric air flow direction.

Heat exchanger 80 is used to lower the temperature of the hygroscopic liquid mixture before it reaches the absorber 10 and is configured to transfer a portion of the heat created by the desorption process occurring in the desorber vessel 12 externally of the apparatus. Cooling improves the equilibrium tendency of absorption of the water vapour from the atmospheric air by the hygroscopic liquid mixture, thereby increasing the amount of water vapour that is captured and improving system efficencies. The heat exchanger can be configured to use any of the common heat exchanger cooling methods practised in industry including the use of heat pipes. The preferred embodiment is to use heat pipes as they require no external energy to work. The amount of cooling is controlled by temperature differential from sensors 41 and 28 (see FIG. 2).

In the FIG. 2 embodiment, at least a portion of the hygroscopic liquid mixture is continuously circulated via conduit 403 by mechanical liquid pump 444 between the absorber's accumulator 15 and the shower assemblies 32, 33. This continuous circulation loads the hygroscopic liquid mixture with the captured atmospheric air water vapour resulting in a density reduction of the hygroscopic liquid mixture and its transformation to the water rich hygroscopic liquid mixture. This circulated hygroscopic liquid mixture is cooled by heat exchanger 401. The amount of cooling is controlled by the temperature differential measured between sensors 411 and 28.

In the FIG. 2 embodiment, a portion of the water rich hygroscopic liquid mixture is recirculated directly to the shower assemblies 32, 33, while the remainder is directed (transferred) to the desorption vessel 46 (described) for regeneration purposes. Once regenerated as the hygroscopic liquid mixture, the hygroscopic liquid mixture is flowed to the shower assemblies 32, 33. The proportion of water rich hygroscopic liquid mixture transferred to the absorber vessel 46 intake is dependent on the rate of water vapour captured as indicated by the density changes measured by sensor 352. A standard inline mounted density measuring device with a continuous digital feed to the application software computer is used. The data feed can be via cable or wireless. Preferably, in the FIG. 2 embodiment, the difference between concentration of LiCl within the hygroscopic liquid mixture leaving the outlet of the desorption vessel 46 and the concentration of LiCl within the hygroscopic liquid mixture entering the inlet of the absorber vessel 18, based upon the total weight of mixture, deviates no more than 5 wt %, and more preferably no more than 1%, and even more preferably no more than 0.5 wt %, during continuous operation.

A plurality of transfer pipes 30 are provided to continuously introduce the hygroscopic liquid mixture to the absorber vessel 18 for contact with the atmospheric air. The transfer pipes 30 are fluidly coupled to shower assemblies 32, 33 disposed within the absorber vessel 18. The shower assemblies 32, 33 include spray nozzles which are configured to spray liquid spray droplets into the atmospheric air stream being flowed through the absorber vessel 18. The spray nozzles 32 are disposed upstream of the spray nozzles 33, relative to the flowing atmospheric air. The spray nozzles on shower assemblies 32 are designed to produce very fine size droplets and a dense spray pattern where the droplet spacing is minimal for the purposes of maximizing the liquid to gas surface contact area It is preferred to maximize the liquid to gas surface contact area in order capture the greatest amount of water vapour from the atmospheric air per unit of energy consumed Droplet sizes approaching 500 microns are desirable. Experimentation has shown that the fine droplets 31 are prone to swirling in the airflow and can become entrained in the atmospheric air flow and carried out of the absorber vessel 18 unless a method of containment is implemented.

In this respect, the spray nozzles on shower assemblies 33 are configured to produce coarse size droplets 34 at a position in the space 19 in closer proximity to the outlet 182 than the position at which the fine size droplets 33 are introduced. The coarse size droplets 34 are introduced downstream of the fine size droplets 31 for the purpose of capturing, or coalescing with the fine spray droplets 31 which may become entrained in the atmospheric air flow. The coarse droplets 34 include droplets having varying diameters. The coarse size droplet (or droplets) 34 having the largest diameter of the coarse size droplets 34 is herein referred to as the largest diameter coarse size droplet. Similarly, the fine spray droplet (or droplets) 31 having the largest diameter of the fine spray droplets 31 is herein referred to as the largest diameter fine size droplet. In one aspect of the present invention, the diameter of the largest diameter coarse size droplets is greater than the diameter of the largest diameter fine size droplets. Preferably, the largest diameter coarse size droplet has a diameter which is 100 times greater than the diameter of the largest diameter fine size droplet. More preferably, the largest diameter coarse size droplet has a diameter which is 1000 times greater than the diameter of the largest diameter fine size droplet. Even more preferably, the largest diameter coarse size droplet has a diameter which is 100,000 times greater than the diameter of the largest diameter fine size droplet.

The coarse size droplets 34 combine with the fine spray droplets 31 entrained in the air flow and, due to the force of gravity and the course spray droplets 34 nozzle exit speeds, are carried downwards into the accumulator 15 located at the base of the absorber vessel 18. The accumulator 15 collects the water rich hygroscopic liquid mixture for further processing. Mist capture screens 16, such as an electrostatic screen, are additionally provided to further mitigate any mist carry over.

The hygroscopic liquid mixture flow rates to the shower assemblies 32, 33 are controlled by the nozzle design parameters which dictate the volumetric flow rate and fluid pressure required to atomize the liquid absorbent stream into fine spray droplets 31 and coarse spray droplets 34. Nozzle selection varies according to the operating conditions of a particular apparatus. Experimentation has shown these operating conditions include, but are not limited to, the atmospheric air temperature, pressure and relative humidity range for a given geographical location, the desired water production volume which governs the volume of atmospheric air to be processed by the absorber 10, the volume of the absorber vessel 11, the operating range of density and viscosity to the hygroscopic liquid mixture, the amount of prime and waste energy available, and the desired water production rate and operating cost per gallon of water produced.

An example of a typical fine spray nozzle 32 is the Spraying Systems Co. VeeJet™ spray nozzles model H-VV series. The jets produce a flat 110° spray pattern. An example of a typical coarse spray nozzle 33 is the Spraying Systems Co. Floodjet™, wide angle spray nozzles model H-VV series. The jets produce a flat 110° spray pattern. For the same operating conditions (temperature, pressure, flow rate), and using the same hygroscopic liquid mixture, the VeeJet™ spray nozzle having an orifice diameter of 0.061 inches produces a largest diameter fine size droplet whose diameter is less than the diameter of a largest diameter coarse size droplet produced by the Floodjet™ spray nozzle having an orifice diameter of 0.066 inches. It has been observed that for an aqueous LiCl solution having 40 wt % LiCl based on the total weight of solution flowing through the VeeJet™ spray nozzle having a diameter of 0.061 inches at a flow rate of 0.52 GPM at a pressure of 30 psig, the largest diameter fine size droplet has a smaller diameter than the largest diameter coarse size droplet produced when flowing the same aqueous lithium chloride solution through a FloodJet™ spray nozzle having an orifice diameter of 0.066 inches at a flow rate of 0.8 GPM and at a pressure of 30 psig.

The desired hygroscopic liquid mixture fed to the shower assemblies 32, 33 comprises a predetermined ratio by weight percent of absorbent material (lithium chloride) and water as measured by density sensors 351, 352. This ratio of hygroscopic liquid mixture to the atmospheric air water vapour in the absorption cycle is controlled by a software algorithm that optimizes the atmospheric air flow rate, the hygroscopic liquid mixture nozzle spray flow rate based on fluid pressure and the partial pressure differential between the partial pressure of water in the hygroscopic liquid mixture and the partial pressure of water vapour m the atmospheric air. Information from sensors 28, 351 and 36 for the hygroscopic liquid mixture's density and temperature, the atmospheric temperature, humidity, and pressure conditions, the available energy and the desired water production rate are the primary inputs to the system control software algorithm.

A heat exchanger, such as heat pipes 38, is disposed in the absorber vessel 18 and is configured to transfer at least a portion of the heat created by the absorption process occurring in the absorber vessel 18 externally of the absorber vessel 18. Such cooling is helpful for improving the equilibrium tendency of absorption of the water vapour from the atmospheric air by the hygroscopic liquid mixture. The heat pipes 38 are coupled to cooling fins 40 disposed externally of the absorber vessel 18. The cooling fins 40 effect dissipation of the heat to the atmosphere. In this respect, a fan 42 is provided to blow air across the cooling fins 40 to assist in the heat dissipation. The fan 42 is controlled by temperature sensors 36 on the heat pipes.

Regeneration

The regeneration process of the hygroscopic liquid mixture is performed by the desorber 12 which includes a desorption vessel 46 and a heater 48. The desorption vessel 46 is configured to operate under internal pressure conditions ranging from standard atmospheric pressure to a deep vacuum and is controlled by the level of vacuum in the condenser 14. The vacuum is typically achieved with a variable speed two-stage rotary van vacuum pump designed to lower the pressure in the desorption vessel 46 and the condenser vessel 52 to a pressure of 25 Torr. The desorption vessel 46 is configured to receive and contain the water rich hygroscopic liquid mixture transferred from the absorber 10. The water rich hygroscopic liquid mixture is drawn into the desorption vessel 46 by the force of the vacuum within the desorption vessel 46 which results in a pressure differential between the absorber vessel 18 and the desorption vessel 46. The level of the water rich hygroscopic liquid mixture in the desorption vessel 46 is controlled by the liquid level sensor and control valve assembly 49 by throttling the rich liquid absorbent flow rate as it flows to pump assembly 73 (see the FIG. 2 embodiment).

The heater 48 is configured to impart heat energy to the water rich hygroscopic liquid mixture to effect continuous production of a gaseous mixture 50 from the water rich hygroscopic liquid mixture. The gaseous mixture 50 predominantly includes water vapour and, to a small extent, other gaseous components, such as inert gases. By operating the desorber 12 under a partial vacuum, the vaporization temperature is effectively lowered, facilitating the use of lower grade heat (lower temperature) to effect release of the water vapour from the lean liquid absorbent The amount of heat introduced to the desorption vessel 46 is controlled by the temperature sensor 53 and pressure sensor 55 and the rich liquid absorbent density sensor 351 and the lean liquid absorbent density sensor 352. The system 8 control software uses the vacuum pressure from pressure sensor 622, the liquid absorbent density value from density sensor 352 and standard steam table temperature and absolute pressure values, adjusted to account for the liquid absorbent density which is higher than pure water, to determine the optimal operating temperature for the regenerator 12. This calculation is used to start the regeneration process and further temperature adjustments are made by the control software based on the data provided by the sensors 351 and 352 and the associated density differential. The regeneration process maintains this liquid absorbent density differential within 1 wt % by increasing or decreasing the heat introduced to the heat exchanger 48. Additional heat results in a faster vaporization rate which increases water production from the regenerator 12 and increases the density of the liquid absorbent departing the regenerator vessel 46. This rich liquid absorbent flows into the lean liquid absorbent flow to the absorber thereby regenerating the liquid absorbent and maintaining the liquid absorbent density level at the desired concentration of LiCl salt to water by weight. This is one preferred method of maintaining equilibrium between the volume of water captured by the absorber 10 from the atmospheric air's water vapour and the volume of water produced for consumption in the condenser 14. Other methods will become apparent to the experienced person skilled in the art. These include measuring the amount of water vapour removed by comparing the humidity levels of the incoming and outgoing air flow. Calculating the water volume and comparing this value to the water produced in the condenser and increasing or decreasing heat to the regenerator to maintain equilibrium. Another method would be to measure and maintain the volume of liquid desiccant in the system 8.

Heat may be supplied to the desorber 12 as waste heat from another unit operation, such as a diesel engine generator 50. Referring to FIG. 2, in the case of reciprocating engine, heat can be used from the exhaust flow as well as the engines coolant. The engine coolant heat exchanger 90 provides a method for raising the temperature of the lean liquid absorbent before it enters the desorption vessel 46. This lowers the amount of energy required to heat the incoming lean liquid absorbent in the desorption vessel 46. The exhaust flow 96 which is at a high temperature is used as the heat source for the desorption vessel 46. The exhaust flow redirector valve assembly 98 is used to control the amount of heat entering the heat exchanger 48, as measured by temperature sensor 53, by diverting a percentage of the exhaust gas flow to the bypass pipe assembly 95. It is understood that such heat can be supplied from any one of a variety of sources, including other waste heat sources and prime heat sources such as, but not limited to, electric heaters, fossil fuels, solar, thermal and nuclear energy and hydrogen generators.

Waste heat is heat energy which is generated as a by-product by any process. The waste heat would otherwise be expelled or rejected to the surrounding environment.

For example, an exhausted gaseous mixture from an engine can serve as a source of waste heat, as such gaseous mixture is, by definition, typically expelled to the surrounding atmosphere. Also, engine coolant in the form of a liquid mixture or a gaseous mixture can also serve as a source of waste heat, as the heat communicated from the engine process to the coolant is then typically expelled or transferred to the atmosphere. Also, any oil lubricant to which heat energy is thermally communicated from an engine process can also serve as a source of waste heat, as the heat communicated from the engine process to the oil lubricant is then typically expelled or rejected or transferred to the atmosphere.

In the above cases (engine exhaust, engine coolant, engine lubricant), the heated engine fluid can be flowed or fluidly communicated away from the engine such that the heated fluid becomes disposed in thermal communication with the water rich hygroscopic liquid mixture so as to effect heating of the water rich hygroscopic liquid mixture and at least in part contribute to effecting vaporization of the water rich hygroscopic liquid mixture. For example, such heated fluid may be flowed to the desorber 12 so as to thermally communicate heat energy to the water rich hygroscopic liquid mixture in the desorber 12. Alternatively, a heat pipe, or any other type of heat exchanger, could be used to indirectly effect beat transfer between the heated engine fluid and the water rich hygroscopic liquid mixture.

A further example of a source of waste heat is condensate rejected from a steam turbine. This includes condensate rejected from the steam driven turbine of a Rankin cycle engine. The steam turbine may also form part of a coal fired, gas powered, or nuclear powered electricity generating process. The condensate could be flowed or fluidly communicated into thermal communication disposition with the water rich hygroscopic liquid mixture so as to effect heating of the water rich hygroscopic liquid mixture and at least in part contribute to effecting vaporization of the water rich hygroscopic liquid mixture. For example, such condensate may be flowed to the desorber 12 so as to thermally communicate heat energy to the water rich hygroscopic liquid mixture in the desorber 12. Alternatively, a heat pipe, or any other type of heat exchanger could be used to indirectly effect heat transfer between the condensate and the water rich hygroscopic liquid mixture.

The hygroscopic liquid mixture in the desorber 12 is continuously removed for purposes of regeneration and return to the absorber 10. In this respect, a pump flow control assembly 73 is fluidly coupled to the desorber vessel 46 and is configured for continuously flowing the hygroscopic liquid mixture to the absorber 10, combining with the hygroscopic liquid mixture being circulated via conduit 403 (described above), thereby completing a regeneration cycle for the liquid absorbent. In the FIG. 2 embodiment, the heat exchanger 80 transfers a portion of the heat contained in the hygroscopic liquid mixture (being transferred from the desorber vessel 46 to the absorber vessel 18) to the incoming water rich hygroscopic liquid mixture thereby preheating the water rich hygroscopic liquid mixture and partially cooling the hygroscopic liquid mixture. The result is higher system energy efficiencies through lowering the regeneration energy requirements for heating.

Condensation

The gaseous mixture 50 continuously flows from the desorber 12 to the condenser 14 under the driving force of the partial vacuum created within the condenser vessel 52. In the preferred embodiment, the pressure of the gaseous mixture in the desorption vessel 46 and the condenser vessel 52 is within a range of between 25 Torr and 760 Torr (i.e. 0.483 psia and 14.7 psia). Preferably, it is as low as possible.

It is understood that the system 8 can be operated with gaseous mixtures having higher pressures in the desorption vessel 46 and the condenser vessel 52 although this is not the preferred embodiment due to energy efficiency losses. The desorber vessel 46 is fluidly coupled to the condenser vessel 52 by a transfer pipe 54. The transfer pipe 54 is as short as practical to keep pressure differentials as small as possible between the desorber vessel 46 and the condenser vessels 52. The condenser 14 includes a heat pipe assembly 58 disposed in the condenser vessel 52 for effecting cooling of the water vapour to effect condensation of liquid water from the water vapour of the gaseous mixture. Once condensed, the liquid water falls to the bottom of the condenser vessel 52.

The partial vacuum in the condenser vessel 52 is maintained by the condensing steam. Prior to operation, the condenser vessel 52 is evacuated by the variable speed vacuum pump 60 to create the desired vacuum conditions.

Vacuum Pump

The vacuum pump 60 also functions as the means for removing the other gaseous components present in the gaseous mixture to maintain the pressure of the gaseous mixture below a predetermined pressure within the condenser vessel 52. The accumulation of these other gaseous components in the condenser vessel 52 increases the pressure of the gaseous mixture in the desorber 12 and the condenser vessel 52, and effectively necessitates a higher quality of heat (higher temperature) in the desorber 12 to release the gaseous mixture from the water rich hygroscopic liquid mixture. The vacuum pump 60 is triggered to effect removal of these other gaseous components upon a high concentration indication of the other gaseous components from within the condenser vessel 52.

In one embodiment, the high concentration indication is a low temperature indication which is sensed in a region 16 of the condenser vessel 52 proximate to the bottom of the vessel and above the level of the collected liquid water. The other gaseous components of the gaseous mixture collect just above the level of the collected liquid mars as they have a higher molecular weight than the water vapour. The other gaseous components of the gaseous mixture release heat to the condensed water which falls downwardly in the condenser vessel 52.

As gas accumulates above the collected water, a temperature and humidity sensor 621 senses a temperature of the gaseous mixture immediately above the collected water. Temperature and float sensor 69 measures temperature and also liquid level of the collected liquid water. This gaseous mixture is at a lower temperature than the collected water. When the temperature differential between that measured by sensors 621 and 69 exceeds a predetermined amount, this indicates that an undesirable concentration of the other gaseous components are present in the gas immediately above the collected water, and the vacuum pump 60 is activated to remove the other gaseous components from the condenser vessel 52. When the temperature difference returns below the predetermined amount, thereby indicating an acceptable amount of the other gaseous components, the vacuum pump 60 is deactivated.

Another means of controlling the cycling of the vacuum pump 60 is through the measurement of humidity immediately above the collected water, by the temperature and humidity sensor 621, which can indicate an unacceptably high inert gas concentration if humidity falls below a predetermined set point. A further means is the vacuum pressure sensor 55, which senses pressure changes in the condenser vessel 52, and which can indicate a build-up of other gaseous components to unacceptably high concentration levels. Any of these means for sensing a high pressure indication can also be combined for purposes of maintaining the desired pressure within the condenser vessel 52 by triggering operation of the vacuum pump 60 to effect evacuation of the other gaseous components from the condenser vessel 52 until sufficient gaseous components are removed.

In another embodiment, sensor 621 consists of a temperature sensor (which functions as described above) and a pressure sensor. The pressure sensor senses pressure just above the level of the collected liquid water. If the pressure is above a predetermined amount, pump 60 is activated and operates until the pressure returns below the predetermined amount.

The vacuum pump 60 is configured to draw the other gaseous components from proximate the bottom of the condenser vessel 52, but above the level of the condensed liquid water. The pipe 62 that draws the other gaseous components from proximate the bottom of the condenser vessel 52 extends upwardly and is cooled by heat pipe assembly 58, permitting steam to condense so that only the other gaseous components of the gaseous mixture (other than steam) are pumped from the condenser by the vacuum pump 60.

Heat Pipes

The heat pipes 58 are used to effect condensation of the water vapour from the gaseous mixture for purposes of reducing the energy load requirements for the system 8. Heat pipes are described in "What is a Heat Pipe" at http://www.cheresources.com/htpipes.html. Suitable heat pipes include gravity flow type heat pipes as well as capillary flow type heat pipes. Examples of a suitable working fluid include propane, ethanol and acetone. By using heat pipes 58 to effect the necessary cooling of the water vapour, the temperature differential of the working fluid in the heat pipe is smaller than for other conventional heat transfer mechanisms This is because the beat transferred from the water vapour to the working fluid, upon condensation of the water vapour, is primarily used as latent heat to vapourize the working fluid and does not cause a substantial increase in the temperature of the working fluid. As a result, the water vapour can be condensed at a lower temperature within the condenser vessel 52. Consequently, the gaseous mixture can be produced in the desorber 12 at lower temperatures, thereby reducing the overall quality of heat energy required for the system. In the exemplary embodiment, the water vapour is condensed in the condenser vessel 52 within a temperature range of between 20° C. and 85° C.

In this respect, in one aspect, the present invention provides a method of separating water from air comprising the steps of (a) contacting air having water vapour with an hygroscopic liquid mixture to produce a water rich hygroscopic liquid mixture, (b) heating at least a portion of the water rich hygroscopic liquid mixture to produce a gaseous mixture having water vapour, (c) condensing at least a portion of the water vapour in the gaseous mixture to produce liquid water and heat energy, and (d) transferring an effective amount of the heat energy to a working fluid including a liquid to effect vapourization of at least a portion of the liquid to produce a working fluid gaseous mixture.

The heat pipes 58 are coupled externally of the condenser vessel 52 to external cooling fins 64. The external cooling fins 64 effect dissipation of this heat to the atmosphere. A fan 66 is provided to blow air across the cooling fins 64 to assist in the heat dissipation. The fan 66 is controlled by temperature differentials between the temperature sensors 621, 622 on the condenser vessel 52 and the temperature sensor 623 on the heat pipes 58 and cooling fins 64. Other embodiments may use this heat for other purposes, in which case the heat would not be dissipated to atmospheric but captured by conventional type heat exchangers which can include using heat rejected from the condenser 14 to preheat the water rich hygroscopic liquid mixture from the absorber 10. Other embodiments may use other means of heat exchangers to remove heat from the heat pipe assembly 58 including refrigeration techniques and other conventional techniques practices in the HVAC industry.

Recovery of Collected Water

A pump flow control assembly 70 is fluidly coupled to the bottom of the condenser vessel 52 to effect removal of the liquid water collected at the bottom of the condenser vessel 52 and transfer to a water holding tank 72 for storage and later use (for example, consumption). The pump 70 is activated by the liquid level sensor 69 which maintains a constant water level in the condenser vessel 52. The water in the holding tank 72 can be treated to maintain purity with carbon filters and ultraviolet light or other conventional treatment means.

Figure 3:
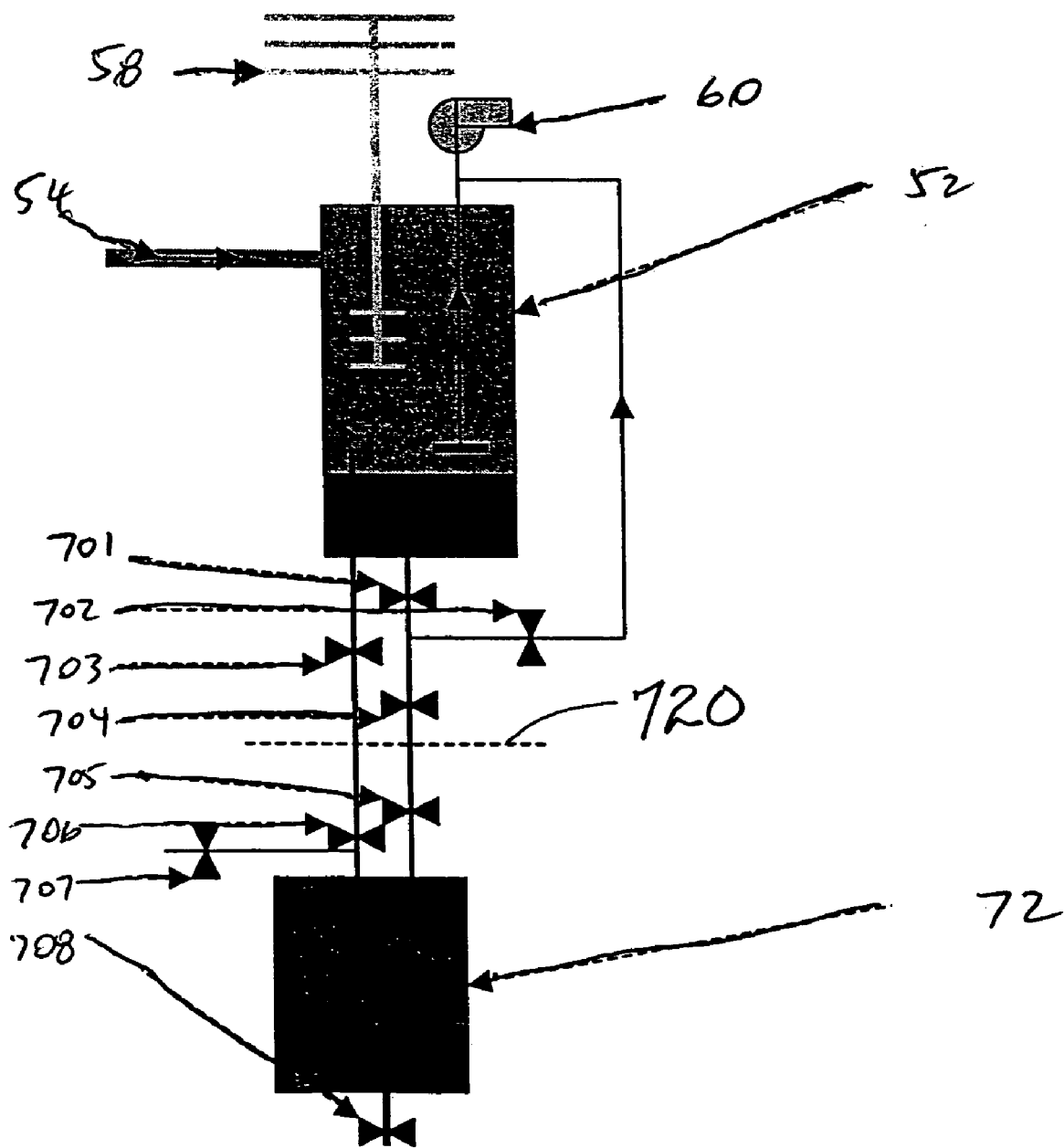
FIG. 3 is a schematic illustration of an alternative embodiment of the combination of the condenser and the water holding tank of the system of the present invention.

An alternate configuration for the holding tank 72 and condenser vessel 52 combination for effecting removal of the water collected at the bottom of the condenser vessel 52 is illustrated in FIG. 3. This configuration enables the draining of the collected water to the holding tank 72 without using a pump flow assembly 70.

In order to be able to use the collected water, the water must be drained from the condenser vessel 52 into atmospheric pressure conditions. Preferably, such collected water should be simply drained by gravity. However, the collected water should be pressurized, to some degree, relative to its state within the condenser vessel 52 (the collected water has a pressure which is subatmospheric), prior to draining, in order to facilitate draining of the collected water within a reasonable time. It is also desirable to maintain low pressure conditions within the condenser vessel 52 and not intermittently pressurize the condenser vessel 52 simply for purposes of facilitating draining of the collected water.

To this end, it is preferred that the collected water, as an intermediate step, be first drained from the condenser vessel 52 and into a water storage holding tank 72, wherein the pressure within the water holding tank 72 is comparable to that within the condenser vessel 52. When sufficient water is drained into the water holding storage tank 72, the water holding tank is isolated from the condenser vessel 52 and then pressurized (for example, by opening a vent to atmosphere). As a result water can be drained at a more reasonable rate into atmospheric conditions by gravity, as the pressure differential against which gravitational forces must operate to effect flow (discharge) of the water is reduced or eliminated.

In this respect, in one aspect, the present invention provides a method of recovering water from air comprising the steps of: (a) contacting air having water vapour with an hygroscopic liquid mixture to produce a water rich hygroscopic liquid mixture, (b) in a first pressure envelope, heating the water rich hygroscopic liquid mixture to produce a gaseous mixture having water vapour, condensing at least a portion of the water vapour to produce liquid water and a depleted gaseous mixture, and separating the liquid water from the depleted gaseous mixture so as to provide collected liquid water and a depleted gaseous mixture at sub-atmospheric pressure disposed in a vapour space above the collected liquid water, (c) effecting fluid pressure communication between a second pressure envelope and the vapour space; and (d)flowing the collected liquid water from the first pressure envelope and into the second pressure envelope.

Referring to the FIG. 3 embodiment, the draining of the water collected in the condenser vessel 52 to the holding tank 72 operates as follows When the holding tank 72 is first fluidly coupled to the condenser vessel 52, valves 701, 703, 707 and 708 are closed, and valves 702, 704, 705, and 706 are opened. This allows the vacuum pump 60 to evacuate the holding tank 72 and its connection lines Once a partial vacuum is established, valve 702 is closed, and valves 701, and 703 are opened. This allows collected water in the condenser vessel 52 to drain through valves 701, 704, and 705 into the holding tank 72 while any vapour is vented into the condenser vessel 52 through valves 703, and 706. Once the holding tank 72 is full, all valves 701 to 706 are closed and holding tank 72 can be uncoupled from the condenser vessel 52 (where quick release couplings are provided along the dotted line 720). Alternatively, the holding tank can remain coupled to the condenser vessel 52 during draining. In this respect, while valves 701 to 706 are closed, valves 707 and 708 are opened to effect such draining. In this embodiment, the vacuum pump assembly 60 would be mounted to the condenser vessel 52 to facilitate vertical movement within the condenser vessel 52 to maintain a predetermined distance to the surface of the water collected in the condenser vessel 52 (and relative to the condenser vessel 52). This vertical movement can be facilitated through mechanical means or a float proximate to the surface of the water.

Operation

In operation of the present invention, an hygroscopic liquid mixture is brought into contact in the absorber 10 with atmospheric air having water vapour. The hygroscopic liquid mixture absorbs water vapour form the atmospheric air to produce a water rich hygroscopic liquid mixture including absorbed water vapour.

At least a portion of the water rich hygroscopic liquid mixture is heated in the desorber 12 under a partial vacuum to produce a gaseous mixture including water and at least one other gaseous component, such as an inert gas. The gaseous mixture is flowed to the condenser 14. The water vapour of the gaseous mixture is cooled and condensed by a heat pipe system 58 in the condenser 14. In this respect, heat energy is transferred from the water vapour to the working fluid in the heat pipe system 58 to effect vaporization of at least a portion of the liquid of the working fluid.

The gaseous mixture is maintained below a predetermined pressure when the water vapour is condense& In this respect, in one aspect, the present invention provides a method of separating water from air comprising the steps of (a) contacting air having water vapour with an hygroscopic liquid mixture to produce a water rich hygroscopic liquid mixture, (b) heating at least a portion of the water rich hygroscopic liquid mixture to produce a gaseous mixture having water vapour and at least one other gaseous component, (c) condensing at least a portion of the water vapour in the gaseous mixture to produce liquid water and a depleted gaseous mixture at a first pressure, and (d) removing at least a portion of the at least one other gaseous component to maintain the first pressure below a predetermined pressure, wherein the depleted gaseous mixture is in fluid communication with the water rich hygroscopic liquid mixture.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

The invention claimed is:

1. A method of recovering water from air comprising:
    (a) providing an absorption system for effecting removal of water from atmospheric air flow by an hygroscopic liquid mixture comprising:
    an absorber vessel defining a space for facilitating contact between air having water vapour and an hygroscopic liquid mixture, including an input air flow inlet, configured for introducing an input air flow having water vapour into the space, a depleted air flow outlet, configured for discharging a depleted air flow, and means for introducing a hygroscopic liquid mixture into the space for effecting contact between the hygroscopic liquid mixture and the input air flow; and
    a base;
    wherein the absorber vessel is rotatably mounted to the base about an axis for effecting positioning of the input air flow inlet at a desired position relative to the axis;
    (b) measuring the direction of atmospheric air flow; and
    (c) rotating the absorber vessel about the axis so as to effect desired positioning of the input air flow inlet relative to the atmospheric air flow direction in response to the measured atmospheric air flow direction.

2. A method of separating water from air comprising the steps of:
    providing an absorber vessel defining a space for facilitating contact between air having water vapour and an hygroscopic liquid mixture;
    introducing an air flow into the space;
    spraying first hygroscopic liquid mixture droplets into the space for effecting contact between the first hygroscopic liquid mixture and the air flow, wherein at least one of the first hygroscopic liquid mixture droplets is a largest diameter fine size droplet; and
    spraying second hygroscopic liquid mixture droplets into the space downstream of the first hygroscopic liquid mixture droplets for effecting contact between the second hygroscopic liquid mixture and the air flow containing an entrained portion of the first hygroscopic liquid mixture droplets, wherein at least one of the second hygroscopic liquid mixture droplets is a largest diameter coarse size droplet;
    wherein the largest diameter coarse size droplet has a greater diameter than the largest diameter fine size droplet.

3. The method as claimed in claim 2, wherein the largest diameter coarse size droplet has a diameter which is 100 times greater than the diameter of the largest diameter fine size droplet.

4. The method as claimed in claim 2, wherein the largest diameter coarse size droplet has a diameter which is 1000 times greater than the diameter of the largest diameter fine size droplet.

5. The method as claimed in claim 2, wherein the largest diameter coarse size droplet has a diameter which is 100,000 times greater than the diameter of the largest diameter fine size droplet.

6. A method of separating water from air comprising the steps of:
    (a) contacting air having water vapour with an hygroscopic liquid mixture to produce a water rich hygroscopic liquid mixture;
    (b) heating at least a portion of the water rich hygroscopic liquid mixture to produce a gaseous mixture including water vapour and at least one other gaseous component;
    (c) condensing at least a portion of the water vapour in the gaseous mixture to produce liquid water and a depleted gaseous mixture at a first pressure; and
    (d) removing at least a portion of the at least one other gaseous component to maintain the first pressure below a predetermined pressure; and
    (e) separating the liquid water from the depleted gaseous mixture such that the depleted gaseous mixture is disposed in a vapour space above the liquid water; wherein the depleted gaseous mixture is in fluid communication with the water rich hygroscopic liquid mixture being heated;
    wherein the predetermined pressure is subatmospheric;
    wherein at least a portion of the water vapour is absorbed by the hygroscopic liquid mixture during the contacting in step (a); and
    wherein the removing in step (d) occurs in response to a high concentration indication of one of the at least one other gaseous component.

7. A method of separating water from air comprising the steps of:
  (a) contacting air having water vapour with an hygroscopic liquid mixture to produce a water rich hygroscopic liquid mixture;
  (b) heating at least a portion of the water rich hygroscopic liquid mixture to produce a gaseous mixture including water vapour and at least one other gaseous component;
  (c) condensing at least a portion of the water vapour in the gaseous mixture to produce liquid water and a depleted gaseous mixture at a first pressure;
  (d) removing at least a portion of the at least one other gaseous component to maintain the first pressure below a predetermined pressure; and
  (e) separating the liquid water from the depleted gaseous mixture such that the depleted gaseous mixture is disposed in a vapour space above the liquid water;
  wherein the depleted gaseous mixture is in fluid communication with the water rich hygroscopic liquid mixture being heated;
  wherein the predetermined pressure is subatmospheric;
  wherein at least a portion of the water vapour is absorbed by the hygroscopic liquid mixture during the contacting in step (a); and
  wherein the removing in step (d) occurs in response to a high pressure indication in the vapour space.

8. A method of separating water from air comprising the steps of:
  (a) contacting air having water vapour with an hygroscopic liquid mixture to produce a water rich hygroscopic liquid mixture;
  (b) heating at least a portion of the water rich hygroscopic liquid mixture to produce a gaseous mixture including water vapour and at least one other gaseous component;
  (c) condensing at least a portion of the water vapour in the gaseous mixture to produce liquid water and a depleted gaseous mixture at a first pressure;
  (d) removing at least a portion of the at least one other gaseous component to maintain the first pressure below a predetermined pressure; and
  (e) separating the liquid water from the depleted gaseous mixture such that the depleted gaseous mixture is disposed in a vapour space above the liquid water;
  wherein the depleted gaseous mixture is in fluid communication with the water rich hygroscopic liquid mixture being heated;
  wherein the predetermined pressure is subatmospheric;
  wherein at least a portion of the water vapour is absorbed by the hygroscopic liquid mixture during the contacting in step (a); and
  wherein the removing in step (d) occurs in response to a low temperature indication in the vapour space.

9. A method of recovering water from air comprising the steps of:
  (a) contacting air having water vapour with an hygroscopic liquid mixture to produce a water rich hygroscopic liquid mixture;
  (b) in a first pressure envelope, heating the water rich hygroscopic liquid mixture to produce a gaseous mixture having water vapour, condensing at least a portion of the water vapour in the gaseous mixture to produce liquid water and a depleted gaseous mixture, and separating the liquid water from the depleted gaseous mixture so as to provide collected liquid water and a depleted gaseous mixture at subatmospheric pressure disposed in a vapour space above the collected liquid water;
  (c) effecting fluid pressure communication between a second pressure envelope and the vapour space; and
  (d) flowing the collected liquid from the first pressure envelope and into the second pressure envelope;
  wherein the flowing step (d) is effected by draining the collected liquid water by gravity;
  wherein the second pressure envelope is a tank;
  wherein the hygroscopic liquid mixture is an aqueous lithium chloride solution; and
  wherein a vacuum pump is fluidly coupled to the vapour space to effect removal of at least a portion of the depleted gaseous mixture to maintain pressure within the vapour space at a subatmospheric pressure, and wherein the vacuum pump is also configured to effect evacuation of the tank.

* * * * *